R. ANDERSON.
ANIMAL RELEASING DEVICE.
APPLICATION FILED MAR. 23, 1916.
1,202,956.
Patented Oct. 31, 1916.
2 SHEETS—SHEET 1.
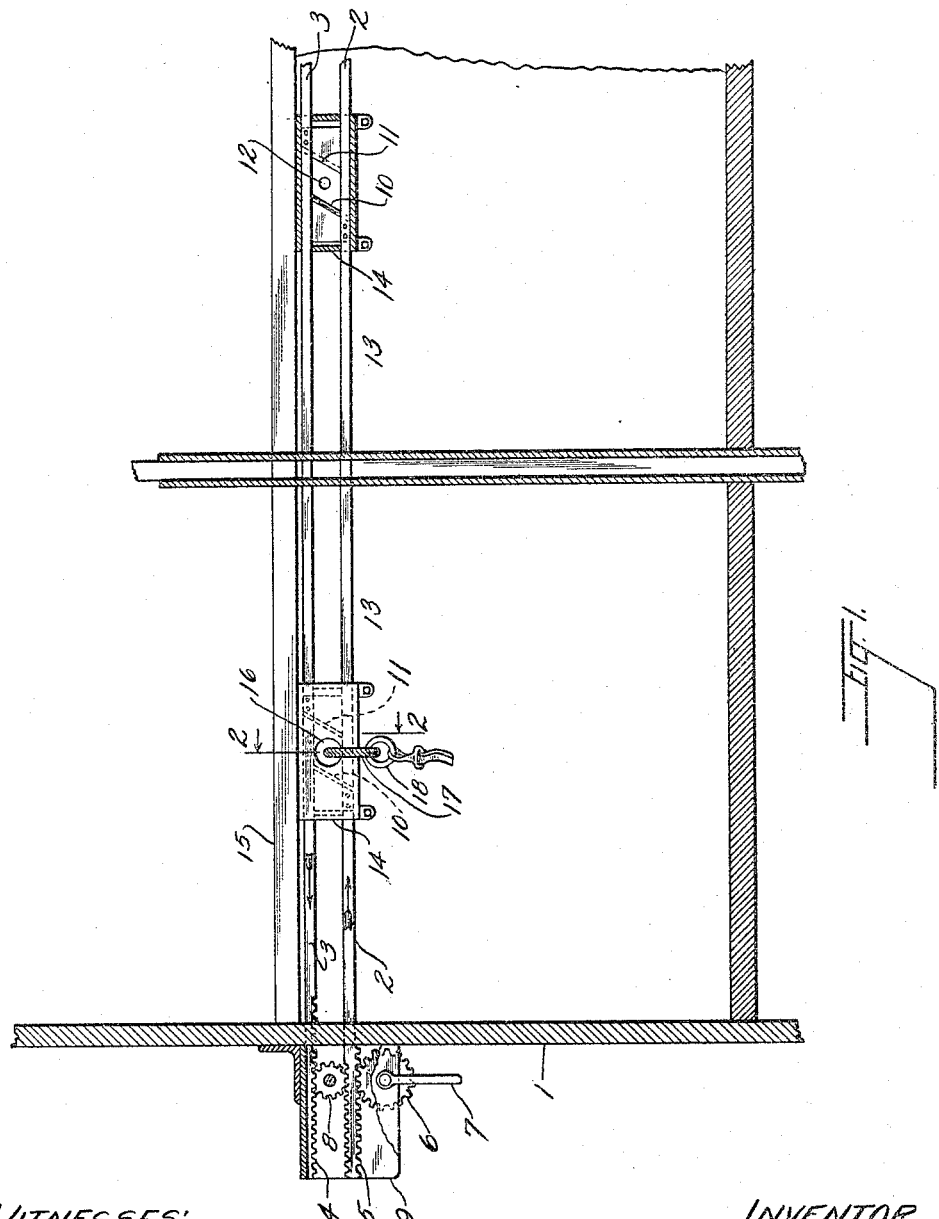
WITNESSES:
INVENTOR
R. Anderson
BY
H. J. Sanders
ATTORNEY R. ANDERSON.
ANIMAL RELEASING DEVICE.
APPLICATION FILED MAR. 23, 1916.
1,202,956.
Patented Oct. 31, 1916.
2 SHEETS—SHEET 2.
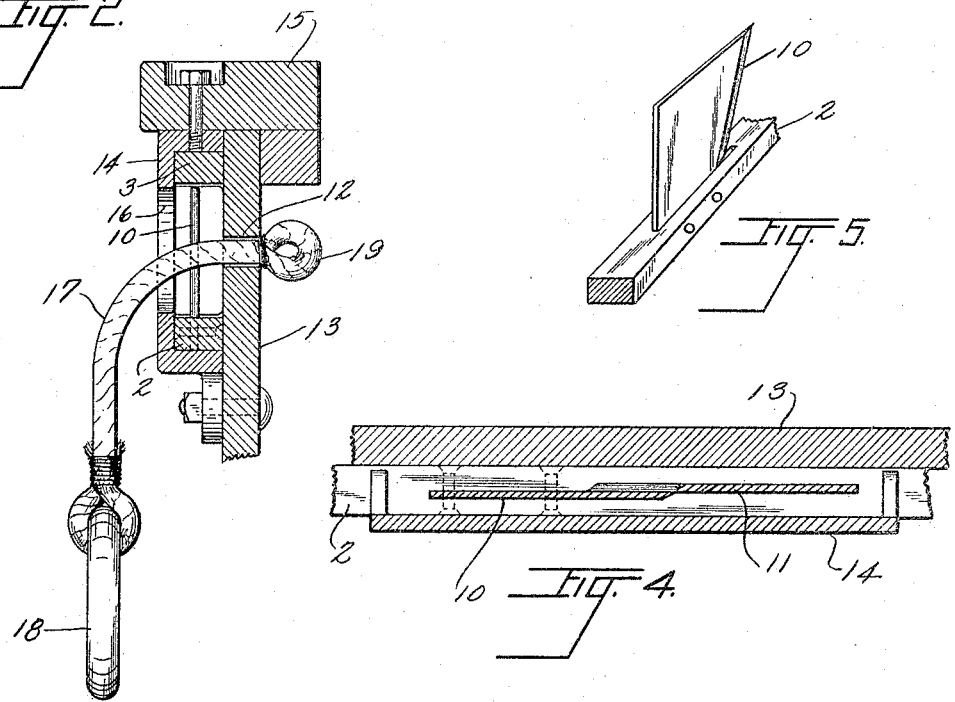
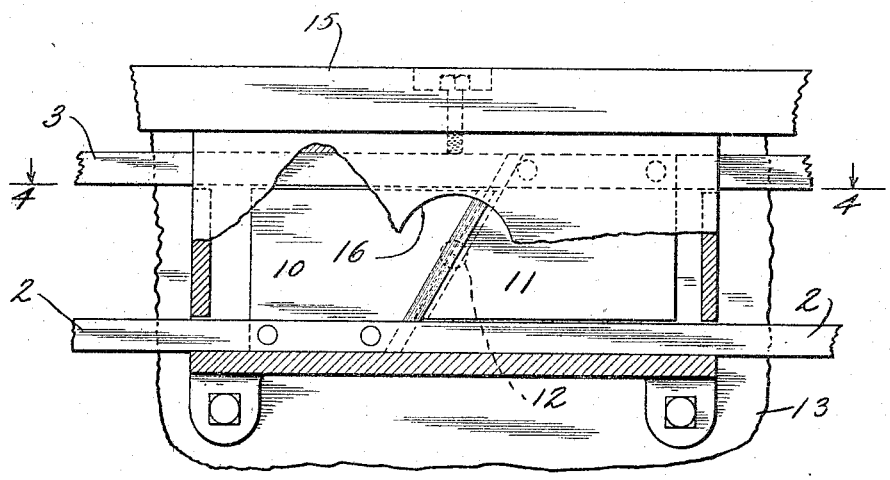

UNITED STATES PATENT OFFICE.

RALPH ANDERSON, OF DOUGLAS, NORTH DAKOTA.

ANIMAL-RELEASING DEVICE.

1,202,956. Specification of Letters Patent. Patented Oct. 31, 1916.

Application filed March 23, 1916. Serial No. 86,143.

*To all whom it may concern:*

Be it known that I, RALPH ANDERSON, a citizen of Sweden, residing at Douglas, in the county of Ward and State of North Dakota, have invented certain new and useful Improvements in Animal-Releasing Devices, of which the following is a specification.

This invention relates to improvements in animal releasing devices and its object is to provide means whereby, in case of emergency, a number of animals may be simultaneously released from a series of stalls in a stable, the release being effected by manually operable means arranged outside the building.

More specifically the invention comprises two reciprocating rods extending through all of the stalls, each of said rods being provided with a plurality of knives; said rods being adapted for movement in relatively opposite directions to cause the knives, a set of which are arranged in each stall, to encounter and sever the halter rope in each stall thereby freeing the animal.

The invention consists in the combination and arrangement of parts to be hereinafter fully described in the following specification, pointed out in the appended claims and illustrated in the accompanying drawings which form a part of said specification and in which:—

Figure 1 is a front elevational view of my invention showing its application. Fig. 2 is an enlarged vertical sectional view taken on line 2—2 of Fig. 1. Fig. 3 is an enlarged fragmentary sectional view. Fig. 4 is a section taken on line 4—4 of Fig. 3. Fig. 5 is a fragmentary perspective view showing the means of securing the knives to the movable bars.

Like reference characters denote corresponding parts throughout the several views.

The reference numeral 1 denotes a stable which is divided into a series of stalls in the usual manner and through the stalls and slidably supported by the stall partitions are the reciprocating rods 2, 3, the ends of which project through one end of the stable and are serrated to form racks 4, 5, the latter rack being formed with two rows of teeth, one row being in mesh with the serrated hand wheel 6 operable by the handle 7 and the other row of teeth being in mesh with a pinion 8 which member is also in mesh with the rack 4, the axle of said pinion being journaled in the housing 9 which incases the racks 4, 5. The bar 2 is provided in each stall with a knife 10 and the bar 3 with a knife 11, the knives, in normal position being spaced away from each other and one knife disposed upon each side of a perforation 12 in the manger wall 13 within each stall.

Each of the knives in each stall is incased between the wall 13 and a boxing 14 which is secured to the manger wall and to the top rail 15 and each boxing is perforated as at 16 in alinement with the perforation 12 in the wall 13; a halter rope 17 extends through the alined openings 12, 16 and carries the hitching ring 18 at one end and is retained against displacement through gravitation by a knot 19 at its opposite end. An animal may be secured in each stall by hitching, in the usual manner, to the ring 18. By rotation of the wheel 6 through the medium of its handle 7 it is readily seen the rods 2, 3 will be moved in relatively opposite directions in the direction of the arrows, Fig. 1. This movement will cause the knives 10, 11 in each stall to approach each other and engage and sever the ropes 17 thus freeing the animals in all of the stalls simultaneously. As this means of release is only resorted to in case of emergency it is understood the ropes 17 will have to be replaced by new ones before the mechanism is ready for another operation.

What is claimed is:—

1. In an animal releasing device, manually operable reciprocating rods, knives carried by said rods and a halter rope disposed in the plane of movement of said knives.

2. In an animal releasing device, longitudinally movable rods, manually operable means associated with said rods whereby they may be made to move in relatively opposite directions, knives carried by said rods and a halter rope disposed in the plane of movement of said knives.

3. In an animal releasing device, longitudinally movable rods, racks formed upon the ends of said rods, a pinion connecting said racks, a serrated hand wheel in mesh with one of said racks to actuate the same, knives carried by said movable rods, and halter ropes disposed in the plane of movement of said knives.

In testimony that I claim the foregoing as my own I have hereto affixed my signature in the presence of two subscribing witnesses.

RALPH ANDERSON.

Witnesses:
N. N. EDWARDS,
JOHN ABRAHAMSON.

Copies of this patent may be obtained for five cents each, by addressing the "Commissioner of Patents, Washington, D. C."